No. 635,536. Patented Oct. 24, 1899.
J. C. FULLERTON.
ATTACHMENT FOR WHEELED PLOWS OR CULTIVATORS.
(Application filed Feb. 11, 1899.)
(No Model.) 2 Sheets—Sheet 1.
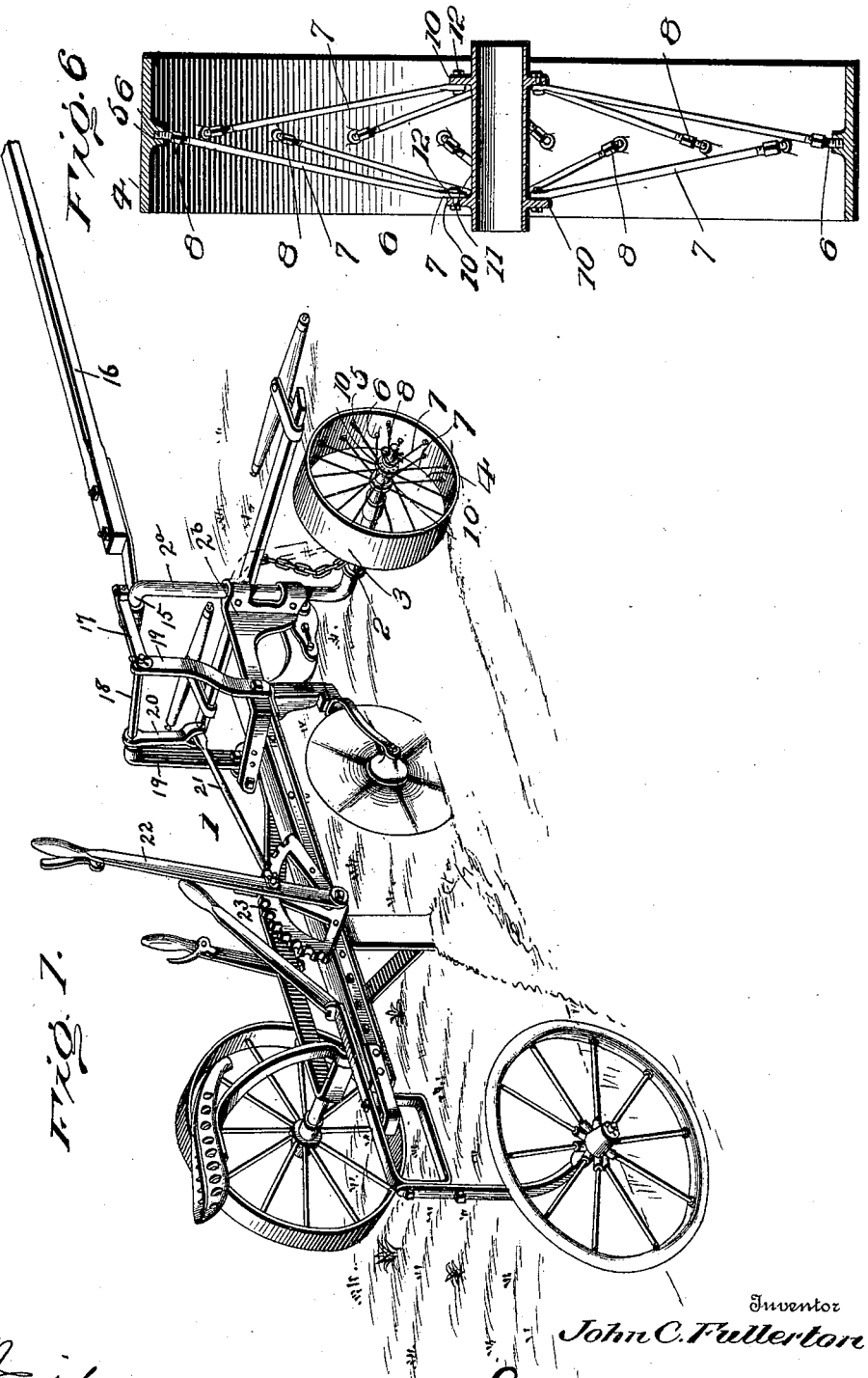
Witnesses
Inventor
John C. Fullerton
by R. S. & A. B. Lacey, his Attorneys No. 635,536. Patented Oct. 24, 1899.
J. C. FULLERTON.
ATTACHMENT FOR WHEELED PLOWS OR CULTIVATORS.
(Application filed Feb. 11, 1899.)
(No Model.) 2 Sheets—Sheet 2.
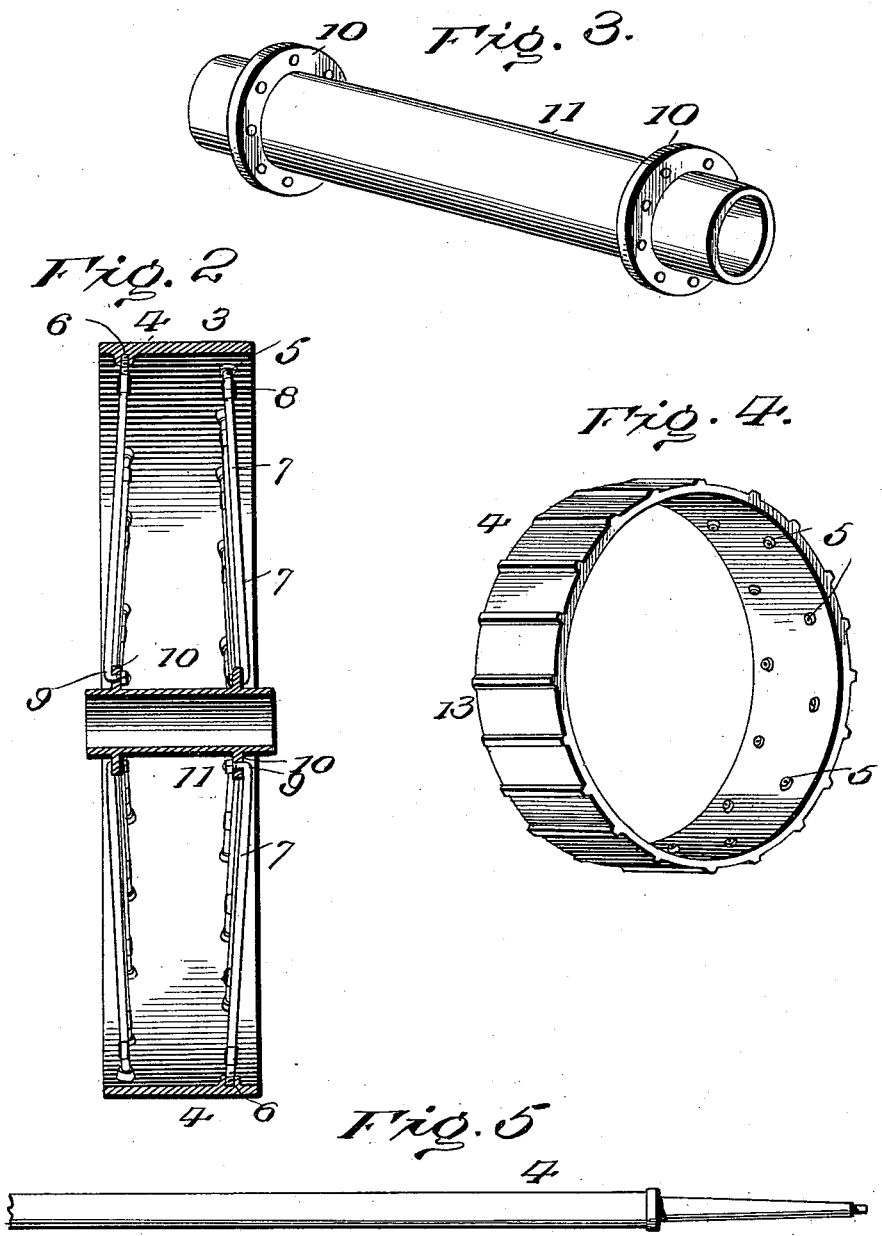

UNITED STATES PATENT OFFICE.

JOHN C. FULLERTON, OF MOORE STATION, TEXAS.

ATTACHMENT FOR WHEELED PLOWS OR CULTIVATORS.

SPECIFICATION forming part of Letters Patent No. 635,536, dated October 24, 1899.

Application filed February 11, 1899. Serial No. 705,310. (No model.)

*To all whom it may concern:*

Be it known that I, JOHN C. FULLERTON, a citizen of the United States, residing at Moore Station, in the county of Frio and State of Texas, have invented certain new and useful Improvements in Attachments for Wheeled Plows or Cultivators; and I do hereby declare the following to be a full, clear, and exact description of the invention, such as will enable others skilled in the art to which it appertains to make and use the same.

This invention relates to agricultural machinery, and more particularly to the class of such devices having plow attachments for cultivating purposes.

The object of the invention is to dispense with the breaking up or comminuting operations now usually carried on subsequently and independently of the plowing operation and to accomplish the desired result during the movement of the plow or device by providing the latter with a rolling attachment, and thereby materially curtail the after labor and time usually expended in preparing plowed soil for planting or sowing purposes.

The invention consists of the construction and arrangement of the several parts, which will be more fully hereinafter described and claimed.

In the accompanying drawings, Figure 1 is a perspective view of an ordinary sulky-plow, showing the improved roller attachment applied thereto. Fig. 2 is an enlarged sectional view of the roller. Fig. 3 is a detail perspective view of the hub of the roller. Fig. 4 is a detail perspective view of a modified form of the roller-rim. Fig. 5 is a detail view of an elongated axle adapted for use at times. Fig. 6 is a sectional view of the roller, showing a further modification.

The improved device is shown applied to a well-known form of plow merely for the purpose of demonstrating its practicability and principle of operation. It can, however, and is intended to be used on any form of wheeled cultivator, breaking-plow, or other analogous devices, except where an inclined wheel striking the furrow-wall is employed, and in connection with well-known adjustable and incidental attachments, such as breakdown and crank axles, without changing the structural features or departing from the spirit and scope of the invention. The roller is located, preferably, on the right side of the machine or device to which it is applied and the wheel on the axle to which it is attached is first removed.

Referring to the drawings, wherein similar numerals are utilized to indicate corresponding parts in the several views, the numeral 1 designates a wheeled plow having an extended axle 2, carried by a standard $2^a$, journaled and slidably mounted in a bracket $2^b$, projecting from the beam, and provided at its upper end with a lateral arm 15, to which the iron on the rear end of the pole 16 is connected. Movably secured at its front end to the pole-iron is a link 17, which is rigidly connected at its rear end to a rock-shaft 18, mounted in supporting-standards 19, rising from the beam. To the rock-shaft is also fixedly secured an arm 20, connected through the medium of a rod 21 with a lever 22, whereby the rock-shaft may be actuated to adjust the frame and axle in a manner that will be readily understood, according to the character of work to be done. The lever carries a pawl which engages with a rack 23 on the beam to hold it in adjusted position. On the outer portion of the axle a roller 3 is movably mounted and comprises a rim 4, which, as shown by Figs. 1 and 2, is smooth and has screw-threaded sockets or taps 5 circumferentially arranged adjacent opposite edges on the inner side to removably receive the outer screw-threaded ends 6 of spokes 7. The spokes adjacent said screw-threaded ends have angular surfaces or enlargements 8 formed thereon for application of a wrench or other implement in securing or removing the spokes to and from the rim. The inner ends 9 of said spokes are angularly bent for insertion in circumferential flanges 10 on opposite portions of a hub 11. Said flanges are regularly formed with openings, and therethrough the ends 9 of the spokes are removably passed and held by nuts.

The tread of the rim 4 is as broad as the width of a turned furrow-slice, and the hub 11 is equally as long as the rim is broad to provide a strong and firm support and increase the bearing on the extended axle, and thereby also avoid wear as much as possible and at least distribute it over a longer bearing.

The spokes 7 as shown by Figs. 1 and 2 are arranged to give the greatest strength, but as shown by Fig. 6 the screw-taps are at about the center and a single line is used. The inner ends of the said spokes in this instance are apertured, and therethrough and through the flanges 10 bolts 12 are removably passed, and this form of attachment can also be readily substituted for that shown by said Figs. 1 and 2.

The rim 4 (shown by Figs. 1 and 2) is intended to be used on moist soil or soil plowed in a moist condition. In Fig. 4 a modification of the rim is shown and embodies one of many ways of providing cross-ribs or slats 13 on the tread-surface thereof. This latter form of rim is used on dry soil to break up the clods or lumps. The two forms of rims are interchangeable on the same hub to accommodate the differences in the condition of the plowed soil, as stated.

An elongated axle may be supplied as an attachment, as indicated by 14, Fig. 5, and project sufficiently to bring the roller in proper position. This elongated axle can be substituted for that on any machine to which the attachment is to be applied and may be primarily constructed and furnished as an auxiliary part to various devices to permit the use of the roller.

In operation the roller travels over the turned furrow-slice next to that being raised or thrown over by the plow and breaks up or comminutes the lumps or clods while rolling the same and simultaneously with the plowing operation, thereby avoiding the necessity of subsequently harrowing or rolling the same and expeditiously preparing the soil for planting or seeding.

Many advantages will become apparent by the use of the attachment other than those enumerated, and the simplicity of the several parts renders the same easily manipulated in the operations of application and detachment.

Having thus described the invention, what is claimed as new is—

In a wheeled plow or cultivator, the combination, with a beam having a bracket, of a standard having an extended axle and journaled and slidably mounted in said bracket, a pole or tongue connected to the upper end of the standard, a breaking-roller mounted on the axle, supporting-standards rising from the beam, a rock-shaft mounted in the standards, a link connecting the rock-shaft and tongue, an adjusting-lever, an arm connected to the rock-shaft, and a rod connecting the lever and arm, substantially as described.

In testimony whereof I affix my signature in presence of two witnesses.

JOHN C. FULLERTON. [L. S.]

Witnesses:
 A. F. EDMONSTONE,
 A. G. BENNETT.